Patented May 6, 1947

2,420,157

UNITED STATES PATENT OFFICE 2,420,157

RESIN FINISHING OF TEXTILES

Herbert J. West, Stamford, Conn., assignor to American Cyanamid Company, New York, N. Y., a corporation of Maine No Drawing. Application February 12, 1943, Serial No. 475,670

3 Claims. (Cl. 117—161)

This invention relates to the treating and finishing of textiles and textile-forming materials such as cotton, linen, wool, viscose, cellulose acetate, spun rayon, silk and the like. The invention includes processes for the finishing of textiles of the above and other types, textile finishing compositions for use in such processes, and textiles of improved properties finished with the compositions and by the processes of the invention.

Textiles such as cloth and other woven or knitted fabrics have heretofore been treated with finishing compositions containing melamine-formaldehyde condensation products in order to impart crease-resistance, crush resistance, a more desirable hand and other similiar properties. Thus, for example, it is known to apply solutions of monomeric or freshly prepared methylol melamines to cotton percale in order to impart crease-resistance thereto. It has also been proposed to apply alkylated or alcohol-reacted methylol melamines to textiles in order to impart water-repellent properties thereto, but serious difficulties have arisen due to the necessity of employing organic solvents for the application of many of these materials. It is a principal object of the present invention to provide a method of applying melamine-formaldehyde condensation products to textiles in the form of water-soluble products which dissociate or decompose upon further treatment of the textiles to deposit a curable melamine-formaldehyde resin thereon. A further object resides in the application to textiles of normally water-insoluble melamine-formaldehyde condensation products, such as those obtained by reacting methylol melamines with alcohols containing 4 or more carbon atoms, in the form of aqueous solutions or dispersions. Still further objects will become apparent from the following description of preferred modifications of the invention, when taken with the claims appended thereto.

I have found that uncured melamine-formaldehyde condensation products, including the methylol melamines obtained by the condensation of melamine with formaldehyde solutions as well as the alcohol-reacted methylol melamines, can be reacted with salts of tertiary nitrogen bases to form a new class of water-soluble quaternary ammonium salts of melamine-formaldehyde condensation products that are especially well suited for the finishing of textiles. These new products possess the important property of dissociating or decomposing upon heating at temperatures above about 80° C. with the deposition of curable melamine-formaldehyde condensation products. In practicing the process of my invention, I therefore impregnate the textiles to be treated with aqueous solutions or dispersions of these new condensation products and then subject the impregnated textiles to temperatures substantially above 80° C. to decompose the quaternary salt and cure the melamine-formaldehyde resin.

It is well known that melamine condenses with aqueous formaldehyde solutions in ratios of 2 to 6 moles of formaldehyde for each mole of melamine to form monomeric or partially polymerized methylol melamines that can be cured to hard, infusible resins by further heating. It is also known that these methylol melamines can be further reacted with monohydric and polyhydric alcohols in the presence of small amounts of acid condensing agents to form alcohol-reacted products which are known as alkylated methylol melamines and are probably ethers of some or all of the —CH2OH groups of the methylol melamines and the alcohol used. These methylol melamines and their alcohol reaction products or ethers are described generally as melamine-formaldehyde condensation products. In preparing the quaternary ammonium salts used in practicing the present invention they are employed in their uncured state; i. e. as unpolymerized or only partially polymerized products corresponding generally to the respective formulas (1) 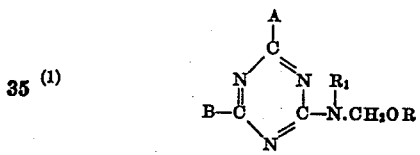

and (2) (M)<sub>x</sub>—N=CH<sub>2</sub>

In (1) A is a radical of the group consisting of —NH2, —NH.CH2OR and —N(CH2OR)2; B is a radical of the group consisting of —NHCH2OR and —N(CH2OR)2; R1 is hydrogen or CH2OR and R is hydrogen or the radical of a reacted alcohol. In (2), (M)<sub>x</sub> represents the nucleus of a partially polymerized but incompletely cured melamine-formaldehyde condensation product.

Any alcohol may be used in preparing the alkylated condensation products such as methyl, ethyl, propyl, isopropyl, butyl, isobutyl, amyl or the various isoamyl alcohols, and the invention in its broader aspects is not limited to the use of any particular alcohol. However, the water repellency of textiles finished with these products is greatly enhanced when at least one alcohol-forming radical of at least 6 carbon atoms is combined in the molecule thereof, and the preferred quaternary ammonium salts are those prepared with the aid of higher aliphatic alcohols such as octyl, decyl, dodecyl, tetradecyl or octadecyl alcohols. Alcohols of the cycloaliphatic and aromatic series may also be employed as, for example, cyclohexanol and cycloaliphatic alcohols of 4–8 or more carbon atoms obtainable by the catalytic reduction of naphthenic acids or aromatic alcohols such as benzyl alcohol and its homologs.

Although salts of any tertiary nitrogen base can be condensed with the monomeric or uncured melamine-formaldehyde condensation products described above, the most important classes of compounds for this purpose are the salts of tertiary amines and the salts of pyridine and pyridinium homologs. The salts of these two classes of compounds correspond respectively to the formulas (a) 

and (b) 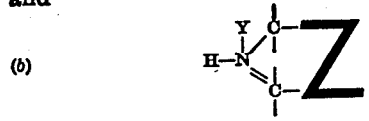

wherein $X_1$, $X_2$ and $X_3$ in the formula (a) are preferably alkyl radicals such as methyl or ethyl and Z in Formula (b) is the residue of a pyridine base. In either formula Y is the anion of the acid that forms a salt with the tertiary nitrogen base and is preferably a halogen such as chlorine, bromine or iodine, although any acid sufficiently strong to form a salt with a tertiary nitrogen base may be employed. These salts are defined as a class by the formula

wherein N(tert) is the tertiary nitrogen base used and Y is as defined above. Suitable tertiary amines are trimethylamine, triethylamine, triethanolamine and the like, while any pyridine base may be employed such as pyridine itself, the alkyl substituted pyridines or picolines or pyridine bases containing condensed aromatic nuclei such as the quinolines.

The quaternary ammonium salts of melamine-formaldehyde condensation products are prepared by heating together one or more compounds of each of the above-described classes at temperatures not substantially higher than 80° C. A solvent such as methanol, ethanol, etc. may be present in the reaction mixture if desired, and this is particularly advantageous in the preparation of large scale batches. The speed of the reaction is dependent largely upon the type of tertiary nitrogen base salt used, being much more rapid with salts of strong acids such as nitrates and hydrochlorides than with the corresponding salts of weak organic acids such as acetates. Salts of pyridine bases with inorganic acids such as hydrochloric, nitric and even sulfurous acid react quite rapidly with uncured melamine–aldehyde condensation products at temperatures of 50–70° C. to form condensation products that are easily soluble in water, therefore the quaternary derivatives of these bases constitute a preferred class of the compounds of the present invention.

The exact mechanism of the reaction is difficult to determine since the tertiary ammonium base salts, and particularly the pyridinium salts of strong inorganic acids are acidic in character and tend to cause partial polymerization of the melamine-formaldehyde condensation products during the heating period. However I believe that the condensation occurs at a hydroxy or alkoxy group of the melamine-formaldehyde condensation product with evolution of water or alcohol or at a methylene-imine group after partial polymerization has occurred, or both. These condensations are expressed by the following reactions, wherein A, B, R and Y are as previously defined and $(M)_x$ represents the nucleus of a partially polymerized but incompletely cured melamine-formaldehyde condensation product.

(I) 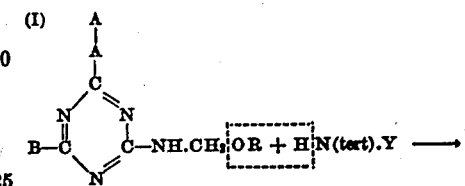

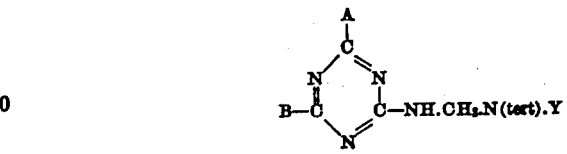

(II) 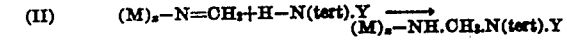

In any event, however, water-soluble or water-dispersible salts are obtained even when water-insoluble melamine-formaldehyde condensation products are employed as starting materials, and the invention in its broader aspects is not limited by the exact nature of the reaction.

The above described quaternary ammonium salts may be applied to the textiles in aqueous solutions either alone or in admixture with other materials, and any suitable application procedure may be employed. Thus, for example, quaternary ammonium salts of alkylated melamine-formaldehyde condensation products may be applied in admixture with water-soluble monomeric methylol melamines or with their water-soluble methyl ethers. Similarly, these products may be applied in admixture with water-soluble methylol ureas such as mono- and dimethylol ureas. The solution may also contain suitable curing accelerators such as salts of phosphoric acid having an acid reaction, hexamethylene tetramine, or mixtures thereof, starches, gums, sulfonated oils and other conventional water-dispersible finishing agents.

One method of application which has given excellent results in practice is the following: A finishing bath is prepared by dissolving a quaternary ammonium salt of one or more melamine-formaldehyde condensation products in water to a 5–15% solution to which methylol ureas, methylated methylol melamines or other auxiliary finishing agents may be added if desired. The textiles are impregnated with this solution by immersion, spraying or any other suitable mechanical means after which the textiles are suspended on tenter frames in a drying oven, heated substantially above 80° C. and preferably at temperatures of about 240–300 F. Heating is continued at these temperatures for a period of time sufficient to decompose the quaternary ammonium salt and set the resulting melamine-formaldehyde resin on the fiber. The cloth is then preferably washed in an aqueous soap solution, which may also contain a small amount of sodium carbonate, in order to remove the pyridine or other tertiary nitrogen base from the fibers.

The invention will be illustrated in greater detail by the following specific examples. It should be understood, however, that these examples are given primarily for purposes of illustration and that the invention in its broader aspects is not limited thereto.

*Example 1*

126 parts (1 mole) of melamine were added to 324 parts (4 moles) of 37% aqueous formaldehyde solution which had been neutralized to a pH of 8.0 by the addition of NaOH solution. The mixture was stirred with gentle heating until solution occurred and then for an additional 15 minutes, after which the batch was cooled and the condensation product crystallized.

25 parts by weight of the tetramethylol melamine prepared in this manner were dissolved in 95% ethyl alcohol and 13 parts of pyridine hydrochloride were added. The mixture was heated at 30–35° C. for 2 hours, after which it was poured into acetone and the pyridinium salt of tetramethylol melamine was recovered by filtration and drying. The product was a white, water-soluble powder.

5 parts by weight of this powder were dissolved in 100 parts of water and 80 x 80 cotton percale cloth was padded in the solution and passed through squeeze rolls set to retain a weight of solution equal to the weight of the cloth. The cloth was then suspended for 8 minutes in an oven heated at 260° F. after which it was washed in a 1% soap solution, rinsed, dried and ironed. A creaseproofed cloth having a crisp hand was obtained.

*Example 2*

Stearylated methylol melamine was prepared by heating 270 parts of methylated methylol melamine with an equal quantity of commercial stearyl alcohol at 130° C. under reduced pressures of 27–28 in. of mercury until a molecular equivalent of methanol was removed. 60 parts of the resulting resin was mixed with 75 parts of 17% pyridine hydrochloride solution in pyridine and 5 parts of paraformaldehyde were added. The mixture was then heated at 60° C. for 30 minutes, cooled to 0° C. and poured into acetone to precipitate the pyridine salt. The white precipitate was filtered, washed with acetone and dried at 50° C.

10 parts by weight of the resulting white powder were dissolved in 100 parts of water and spun rayon challis was padded in the solution and wrung out to retain 10% resin solids on the dry weight of the cloth. The fabric was then heated at 270–280° F. for 6–8 minutes to decompose the quaternary pyridine salt and set the resin on the fibers and was then washed in a 1% soap solution for 15 minutes. After rinsing, drying and pressing the cloth was found to possess excellent water repellency.

*Example 3*

300 parts by weight of solid methylated tetramethylol melamine and 130 parts by weight of commercial octyl alcohol were mixed in a reaction vessel equipped for vacuum distillation and the mixture heated slowly to 123° C. At this point a considerable amount of methyl alcohol had distilled out. A vacuum of 70 cm. was then applied and the heating and distilling continued to a temperature of 130° C. and held under these conditions until no more methyl alcohol would distill. The viscous liquid was removed from the reaction vessel and allowed to cool whereupon a plastic solid resin was obtained.

127 parts of the mono-octylated tetramethylol melamine obtained as described above was reacted with 38 parts of pyridine hydrochloride dissolved in 13 parts of octyl alcohol for 5 minutes at 70–80° C. The solution thus obtained was poured into acetone to precipitate the pyridine salt. After filtering and drying a white free-flowing powder was obtained which was extremely soluble in water.

8 parts by weight of the above product were dissolved in water and 80 x 80 cotton cloth was padded in the solution and passed through squeeze rolls set to retain 8% resin solids in the cloth. After heating at 260° F. for 6–8 minutes followed by scouring and pressing the cloth was found to possess excellent water repellency.

*Example 4*

300 parts by weight of solid methylated tetramethylol melamine and 186 parts by weight of commercial lauryl alcohol were mixed in a reaction vessel equipped for vacuum distillation and the mixture heated slowly to 123° C. At this point a considerable amount of methyl alcohol had distilled out. A vacuum of 70 cm. was then applied and the heating and distilling continued to a temperature of 130° C. and held under these conditions until no more methyl alcohol would distill. The viscous liquid was removed from the reaction vessel and allowed to cool whereupon a plastic solid resin was obtained.

60 parts by weight of the laurylated tetramethylol melamine prepared as described in the preceding paragraph was mixed with 75 parts by weight of a 17% pyridine hydrochloride solution in pyridine and 5 parts by weight of paraformaldehyde. The solution was heated at 50–70° C. until solution occurred, cooled to 0° C. and poured into acetone to precipitate the pyridine salt. The white precipitate was filtered, washed with a little acetone and dried at 50° C. The product was somewhat sticky powder readily soluble in water to give a strongly foaming solution.

50 parts by volume of a 10% aqueous solution of trimethoxy trimethyl melamine, prepared by condensing trimethylol melamine with methanol in the presence of a small quantity of oxalic acid, were mixed with an equal quantity of a 10% solution of the above described pyridine salt and 0.5 part of a diammonium phosphate curing accelerator were added. Cotton cloth and spun rayon challis were impregnated with the resulting resins, squeezed out to retain 10% solids on the dry weight of the cloth and dried and cured by heating in an oven at 280° F. The treated cloth was found to possess excellent water repellency.

*Example 5*

10 parts by weight of trimethylamine hydrochloride were suspended in 40 parts of ethanol and 25 parts of tetramethylol melamine were added. The mixture was heated at 60° C. for about 15 minutes, or until a clear solution was obtained, after which the reaction mixture was poured into acetone. The resulting precipitate was filtered and dried at 40° C. and the product, which was the quaternary ammonium salt of tetramethylol melamine was obtained as a white, water-soluble powder. When a 10% aqueous solution of this powder was heated to boiling there was formed a white resinous precipitate which cured to a water-insoluble resin upon baking at 140–150° C.

5 parts by weight of this material were dissolved in 100 parts of water and printed chintz piece goods were impregnated in the solution, squeezed to retain 5% resin solids on the weight of the dry cloth, and cured for 6–8 minutes in an oven at 260–270° F. The cloth was then washed 15 minutes in a 1% soap solution, rinsed, dried and ironed. A stiff fabric having excellent resistance to creasing was obtained.

The quaternary ammonium salts of melamine-formaldehyde condensation products are described and claimed as new chemical compounds in my copending application Serial No. 475,669, filed February 12, 1943.

What I claim is:

1. A method of finishing textiles which comprises impregnating them with an aqueous solution of a quaternary ammonium salt of a melamine-formaldehyde condensation product and then subjecting the textiles to heating at temperatures above 80° C. to decompose the quaternary ammonium salt and set the resin on the textile fibers.

2. A method of finishing textiles which comprises impregnating them with an aqueous solution of a quaternary pyridine salt of a melamine-formaldehyde condensation product and then subjecting the textiles to heating at temperatures above 80° C. to decompose the quaternary pyridine salt and set the resin on the textile fibers.

3. A method of finishing textiles which comprises impregnating them with an aqueous solution of a quaternary pyridine salt of an alcohol-reacted melamine-formaldehyde condensation product and then subjecting the textiles to heating at temperatures above 80° C. to decompose the quaternary pyridine salt and set the resin on the textile fibers.

HERBERT J. WEST.

REFERENCES CITED

The following references are of record in the file of this patent:

UNITED STATES PATENTS

| Number | Name | Date |
| --- | --- | --- |
| 2,131,362 | Baldwin et al. | Sept. 27, 1938 |
| 2,191,362 | Widmer et al. | Feb. 20, 1940 |
| 2,197,357 | Widmer et al. | Apr. 16, 1940 |
| 2,255,901 | Schroy | Sept. 16, 1941 |
| 2,339,768 | D'Alelio | Jan. 25, 1944 |
| 2,340,044 | D'Alelio | Jan. 25, 1944 |
| 2,368,451 | D'Alelio | Jan. 30, 1945 |
| 2,371,892 | Hood | Mar. 20, 1945 |

FOREIGN PATENTS

| Number | Country | Date |
| --- | --- | --- |
| 495,830 | British | Nov. 18, 1938 |